Aug. 11, 1936.  G. C. CHRISTY  2,050,275
OILING DEVICE FOR JOURNALS
Filed Nov. 16, 1931  2 Sheets-Sheet 1
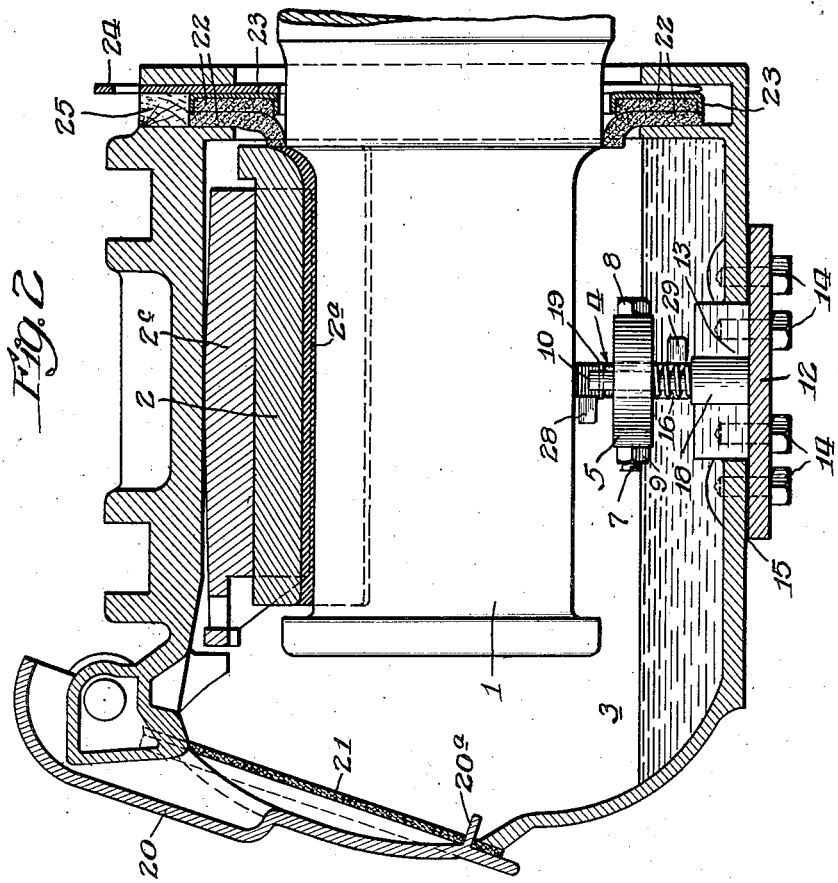
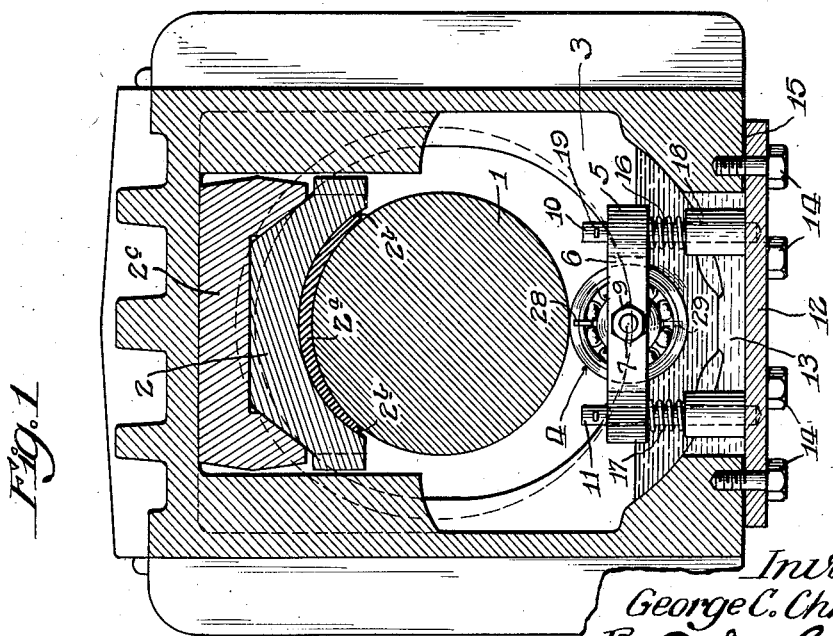
Inventor
George C. Christy
By Parker & Carter Attys.

Aug. 11, 1936.  G. C. CHRISTY  2,050,275
OILING DEVICE FOR JOURNALS
Filed Nov. 16, 1931  2 Sheets-Sheet 2
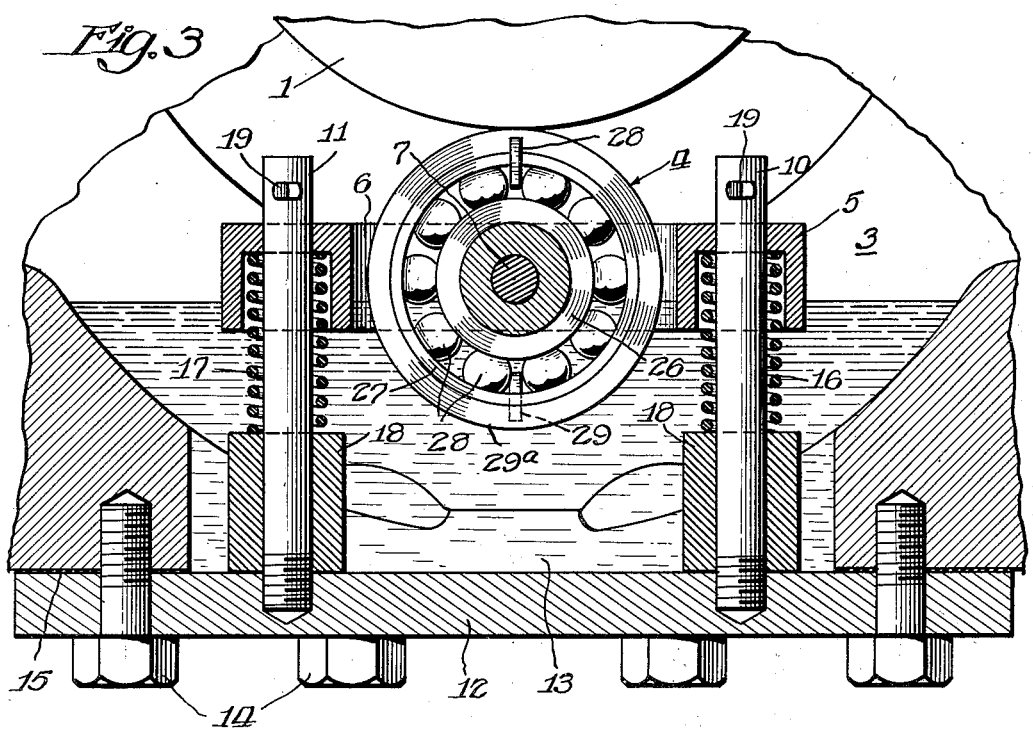
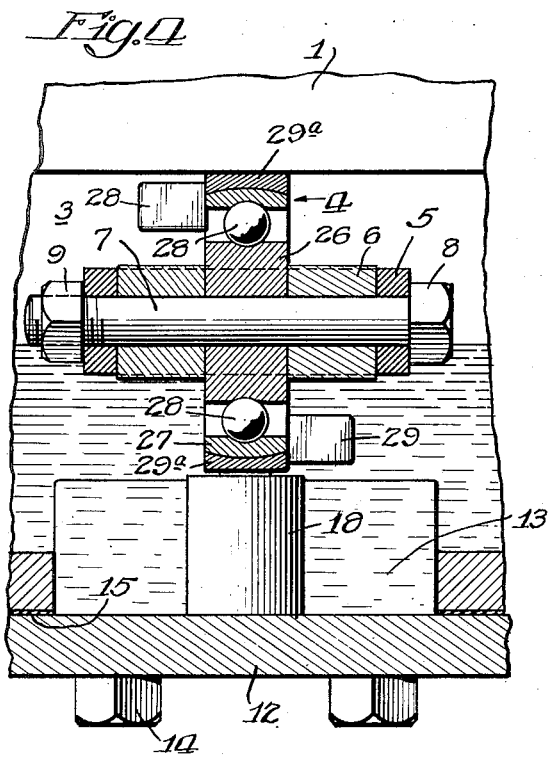
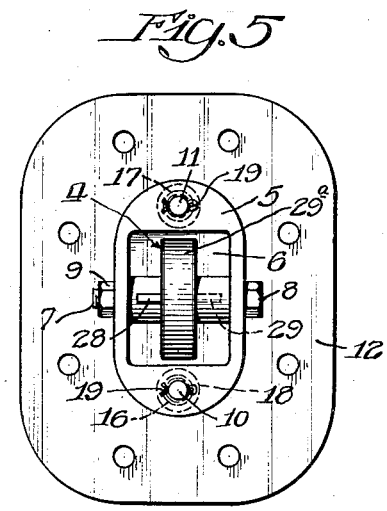
Inventor:
George C. Christy
By Parker & Carter Attys Patented Aug. 11, 1936

2,050,275

UNITED STATES PATENT OFFICE 2,050,275

OILING DEVICE FOR JOURNALS

George C. Christy, Chicago, Ill.

Application November 16, 1931, Serial No. 575,188

6 Claims. (Cl. 308—91)

This invention relates to oiling devices for journal boxes and has for its object to provide a new and improved device of this description. The present method of filling the cavity under the journal with oil soaked waste has many disadvantages, being wasteful and allowing dirt and foreign material to have access to the journal bearing. The waste also backs down away from the journal, requiring frequent reworking with packing tool at the various stations to bring it up into contact with the journal. This requires an unduly high cost in labor as well as in waste. One of the objects of my invention is to obviate these disadvantages. The invention has as a further object to reduce the amount of oil and secure complete service from the oil used, applying it in a sufficient quantity to insure the proper lubrication at all times. The invention has as a further object to provide an oiling device which entirely obviates the danger of fire or the access of dirt, water or other foreign material to the journal. The invention has other objects which are more particularly pointed out in the accompanying description.

Referring now to the drawings, Fig. 1 is a cross sectional view of one form of oiling device embodying the invention;

Fig. 2 is a longitudinal sectional view of the device shown in Fig. 1;

Fig. 3 is an enlarged vertical sectional view through the oil conveyer supporting member;

Fig. 4 is a sectional view through the oil conveyer;

Fig. 5 is a plan view of the oil conveyer and supporting parts.

Like numerals refer to like parts throughout the several figures.

Referring now to the drawings, I have shown a construction particularly adapted for use for lubricating bearings, having only a half bearing secured in the top of an oil chamber and bearing on the journal or axle only on its upper half or portion, leaving the lower half free to receive a lubricant which is conveyed to the bearing by the turning of the journal or axle. In the drawings I have shown such a construction where the journal or axle 1 with a bearing 2 which engages only the upper portion of the journal or axle. Below the journal or axle is an oil chamber 3 which contains the oil or lubricant.

Some means is provided for conveying the oil to the journal or axle 1. In the construction shown I have provided an oil conveyer 4, which is illustrated as consisting of a wheel preferably rotatably mounted in position under the journal or axle. In the particular construction shown this oil conveyer 4 is rotatably mounted in a support 5, which as herein shown consists of a piece or bar containing a slot 6 through the center thereof, the oil conveyer or wheel 4 being located in this slot and having a bearing pin 7 which projects through holes in the sides of the support 5. This bearing pin is shown in the form of a bolt with a head 8 at one end and a removable nut 9 at the other end. The support 5 is mounted on guides 10 and 11 which are attached to a plate 12. The journal box has an opening 13 in the bottom through which the guides 10 and 11 project as shown in Fig. 1. The plate 12 is fastened to the box at the bottom so as to completely close the opening 13, the fastening being in any desired manner, as by the screws 14. A gasket 15 is placed between the plate at the bottom of the box so as to make an oil tight joint.

Some means is provided for elastically pressing the oil conveyer or wheel 4 against the journal or axle. In the construction shown the support 5 is slidably mounted on the guides 10 and 11 and springs 16 and 17 engage the support 5 at one end and stops 18 on the guides, such springs pressing the support 5 and the oil conveyer or wheel 4 upwardly so that the oil conveyer is elastically held against the lower face of the journal or axle. In the construction shown the support 5 is recessed for the upper ends of these springs. Limiting devices 19, which may be pins, are connected with the guides 10 and 11 so as to limit the upward movement of the support 5.

The journal box has a lid 20 through which oil may be inserted, there being a gasket 21 to make an oil tight closure. The journal box itself is made oil tight at the point where the journal or axle 1 enters it by means of one or more layers 22 of felt or other suitable material, see Fig. 2. One of these layers is preferably located in an oil retaining guard 23. A wedge plate 24 is applied after the box is in position on the journal, which acts to clamp the parts together so that the layers of felt 22 will be brought tightly into contact with each other and with the opposed parts so as to form an oil tight joint. A wood filler 25 may be placed in position as shown in Fig. 2.

In the operation of the device, when oil is used, such oil may be splashed up on the lid 20. To prevent this oil from running down between the lid and the packing 21, I provide on the lid an oil deflector 20a, arranged near the bottom of the lid so that any oil splashed upon the lid will be deflected away from the opening and return to the body of oil in the oil chamber. I may provide the oil conveyer or wheel 4 with means for assisting it in moving the oil or lubricant from the receptacle up to the journal. In this construction I have provided wings or projections 28 and 29 on the wheel. It will be seen that these wings pick up oil and throw it up on the wheel. With this construction I may use as a lubricant not only oil but grease, that is a lubricant which is quite viscous. When such a lubricant is used the wings or projections 28 and 29 are placed quite a distance apart so that they will not form a path in the viscous lubricant. By using only two of these projections, for example at opposite sides, that is 180° apart, it will be seen that the wing on one side of the wheel will leave the lubricant about the time the wing on the other side enters it, and this gives time for the viscous material to fill up the groove formed by the wing.

The oil conveyer or wheel 4 may of course be made up in any suitable manner. I prefer to make it a ball bearing structure having an inner ball bearing race 26 on the pin 7, see Fig. 3, with an outer ball bearing race 27 and a series of balls 28 between them, as shown in Figs. 3 and 4. The outer race may be provided with a soft metal tire 29ª, as it were, which engages the journal or axle, and which increases the efficiency of the device.

In the operation of the device, as the journal turns it turns the conveyer or wheel 4, the lower portion of which is always submerged in the lubricant. This carries the lubricant up to the journal or axle and applies it to the journal or axle, and this lubricant is then carried by the journal or axle to the bearing on the upper part thereof.

In Fig. 1 the journal 1 is shown with the upper bearing 2 with the wedge 2c, the bearing 2 having a bearing face 2a of babbitt or the like. I prefer to have this babbitt somewhat shorter than the remaining portion of the bearing so that the end faces 2b thereof are somewhat higher than the end faces of the part 2. It will be noted that the oil conveying device or wheel 4 is narrow in width, as clearly shown in Fig. 2. I have found that it is of great importance to have this wheel narrow. If, for example, the wheel extended the entire length or a greater portion of the length of the journal, I have found that it churns the lubricant in the receptacle in such a way as to mulsify or atomize it, and the lubricant then leaks out of the box and is wasted. By making the wheel narrow and having it engage the journal, preferably near the middle, that is the wheel being so narrow that it only engages a comparatively small portion of the journal, this difficulty is avoided and the lubricant which is conveyed to the journal by the wheel 4 is spread or distributed along the journal in the proper manner This distribution is assisted by the faces 2b of the babbitt on the journal. This construction, therefore, acts satisfactorily as a lubricating device and yet does not churn the oil so as to cause it to escape from the box.

The oil conveying device should have a width less than one-third the length of the journal to be lubricated, and in most cases it must be much narrower than this. The proportion shown in the drawings gives satisfactory results.

The use of a ball bearing for the lubricant conveying device forms a frictionless means of conveying the lubricant from the receptacle to the journal. Since the lubricant conveying device has a tire or outer covering or material softer than the journal or wheel, it prevents cutting or marring the surface of the journal. This construction also produces a self-aligning outer tire which insures a full face engagement of the lubricant conveying device with the journal surface at all times.

I claim:

1. An oiling device for journals, having a bearing at the top of the journal, comprising a box in which the bearing is mounted and having a lubricant receptacle therein, said box having an opening in its bottom, a plate, removable fastening means for fastening the plate to the bottom of the box to cover said opening, a lubricant conveying device rotatably connected with said plate and engaging said journal when the plate is in position and comprising a wheel, a support therefor upon which the wheel is rotatably mounted, said wheel having a body portion and an outer bearing surface separate from the body portion and adjustably connected therewith, said outer bearing surface projecting into the lubricant in the lubricant receptacle and presenting a full lubricated face to the journal surface at all times.

2. An oiling device for journals having a bearing at the top of the journal, comprising a box in which the bearing is mounted and having a lubricant receptacle therein, a lubricant conveying device comprising a wheel, a support therefor, having a slot therein in which the wheel is located so that a portion of said wheel will be immersed in the lubricant in said receptacle, the wheel being rotatably connected with said support, said wheel having an outer self-aligning bearing surface which is moved in and out of the lubricant in the lubricating receptacle and which presents a full lubricated bearing surface to the journal at all times, posts on which the support is slidably mounted, said posts fastened in position below the journal and means for causing said wheel to engage the journal.

3. An oiling device for journals having a bearing at the top of the journal, comprising a box in which the bearing is mounted and having a lubricant receptacle therein, a lubricant conveying device comprising a wheel having an outer soft metal tire, a support therefor, having a slot therein in which the wheel is located so that a portion of said wheel will be immersed in the lubricant in said receptacle, the wheel being rotatably connected with said support, posts on which the support is slidably mounted, said posts fastened in position below the journal and being in alignment with said wheel, springs surrounding said posts located below said support, and limiting devices on said posts above said support.

4. An oiling device for journals having a bearing at the top of the journal, comprising a box in which the bearing is mounted, and having a lubricant receptacle therein, a lubricant conveying device rotatably mounted in said receptacle having a continuous lubricated engaging face which engages said journal, the lower part of said lubricant conveying device being immersed in the lubricant in the receptacle, and projections on opposite sides of said lubricating device, the part of the lubricating device which engages the journal being located between said projections.

5. An oiling device for journals having a bearing at the top of the journal, comprising a box in which the bearing is mounted, and having a lubricant receptacle therein, a rotatable lubricant conveying device mounted in said receptacle so as to engage said journal, said lubricating device having a body portion and an outer bearing face separate from the body portion, and balls interposed between the body portion and the outer bearing face, said outer bearing face having a soft metal tire having a width which is less than one-third the length of the journal to be lubricated.

6. An oiling device for journals having a bearing at the top of the journal, comprising a box in which the bearing is mounted, and having a lubricant receptacle therein, a lubricant conveying device consisting of a wheel mounted in said receptacle, the outer face of which engages the journal, said wheel being provided with a self-aligning outer member which presents a full face bearing to the journal surface at all times.

GEORGE C. CHRISTY.